United States Patent
Staggs (10) Patent No.: US 10,831,355 B2
(45) Date of Patent: Nov. 10, 2020

(54) SYSTEMS AND METHODS FOR CHANGING ORIENTATION OF VISUAL INFORMATION DISPLAYED BETWEEN ADJACENT USERS

(71) Applicant: The Boeing Company, Chicago, IL (US)

(72) Inventor: Thomas J. Staggs, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/377,995

(22) Filed: Apr. 8, 2019

(65) Prior Publication Data

US 2020/0319779 A1  Oct. 8, 2020

(51) Int. Cl.
| | | |
|---|---|---|
| *G06F 3/01* | (2006.01) | |
| *B64C 13/00* | (2006.01) | |
| *G06F 3/0488* | (2013.01) | |
| *G06F 3/0484* | (2013.01) | |
| *G06F 3/14* | (2006.01) | |
| *B64D 43/00* | (2006.01) | |
| *G02B 27/01* | (2006.01) | |
| *G06F 3/0482* | (2013.01) | |

(52) U.S. Cl.
CPC ......... *G06F 3/04845* (2013.01); *B64D 43/00* (2013.01); *G06F 3/04886* (2013.01); *G06F 3/14* (2013.01); *G02B 27/017* (2013.01); *G06F 3/017* (2013.01); *G06F 3/0482* (2013.01); *G06F 2203/04803* (2013.01)

(58) Field of Classification Search
CPC .... G06F 3/017; G06F 3/0482; G06F 3/04883; G02B 27/017; G02B 2027/014
See application file for complete search history.

(56) References Cited

U.S. PATENT DOCUMENTS

| | | | | |
|---|---|---|---|---|
| 7,321,318 | B2 * | 1/2008 | Crane | G01C 23/005 |
| | | | | 340/971 |
| 7,418,319 | B2 * | 8/2008 | Chen | G01C 23/00 |
| | | | | 701/14 |
| 7,460,029 | B2 * | 12/2008 | Boorman | G01C 23/00 |
| | | | | 340/975 |
| 8,896,632 | B2 * | 11/2014 | MacDougall | G06F 1/1626 |
| | | | | 345/173 |
| 9,063,644 | B2 | 6/2015 | Zeng | |
| 9,128,594 | B1 * | 9/2015 | Hufnagel | G06F 3/04845 |
| 9,347,791 | B2 | 5/2016 | Sia | |
| 9,352,848 | B2 | 5/2016 | Nikolic et al. | |

(Continued)

*Primary Examiner* — Jordany Nunez (74) *Attorney, Agent, or Firm* — Ostrager Chong Flaherty & Broitman P.C.

(57) ABSTRACT

Systems and methods for changing the orientation of information displayed on a display device mounted on a control pedestal at a position between two seats. One method involves changing the orientation of information displayed on a display device located on a control pedestal of an aircraft so that, instead of sub-optimal joint viewing of the displayed information by two pilots, an individual pilot may be able to read the displayed information more easily. The system enables either pilot to select a respective more optimal orientation for the displayed information for individual viewing. Each pilot may separately then quickly switch the display mode back to the "up is forward" orientation for joint viewing. Returning to the "up is forward" orientation may also be set to occur as a function of time.

21 Claims, 8 Drawing Sheets (56) References Cited

U.S. PATENT DOCUMENTS

| | | | |
|---|---|---|---|
| 9,703,476 B1* | 7/2017 | Pappas | G06F 3/04886 |
| 9,940,985 B2* | 4/2018 | Tiwari | G11C 8/10 |
| 2008/0129666 A1* | 6/2008 | Shimotono | G06F 1/1677 |
| | | | 345/87 |
| 2016/0132130 A1* | 5/2016 | Lu | G06F 1/1694 |
| | | | 345/659 |
| 2017/0314959 A1* | 11/2017 | Chavez | G06F 3/04886 |
| 2017/0344181 A1* | 11/2017 | Kneuper | G08G 5/0052 |

* cited by examiner

SYSTEMS AND METHODS FOR CHANGING ORIENTATION OF VISUAL INFORMATION DISPLAYED BETWEEN ADJACENT USERS

BACKGROUND

The present disclosure relates generally to aircraft and in particular to systems and methods for controlling the display of information on the flight deck of an aircraft. Still more particularly, the present disclosure relates to systems and methods for controlling displays on the flight deck of an aircraft via operator interactions with touchscreens. As used herein, the term "display" means a visual representation of information which is presented in an area on a display medium (e.g., a screen) of a display device.

A pilot or other operator of an aircraft may use various displays on the flight deck of the aircraft to monitor and control the operation of various aircraft systems. Traditionally, numerous analog devices, such as electromechanical gauges and dials, were used to display information on the flight deck of an aircraft. In more modern aircraft, information is provided to the pilot or other operator of the aircraft via digital electronic display devices. For example, information for various aircraft systems may be displayed on liquid crystal display devices, cathode ray tube display devices, or other similar display devices on the flight deck of an aircraft.

A typical flight deck of an aircraft has a forward instrument panel and a control pedestal. Instruments and display screens are distributed over the forward instrument panel and the control pedestal for easy access by the pilots. The display screens are electronically controlled by respective display processors (not shown) to present various visual displays of information, such as primary flight displays (PFDs), an engine display, and multi-function displays (multi-function displays). For example, without limitation, such displays may include navigation displays, system displays, communication displays, information displays, flight management displays, checklist displays, other appropriate displays, or various combinations of displays.

A multi-function display may be used to display information to the operator of an aircraft in numerous configurable ways. For example, without limitation, a multi-function display may be configured to display a navigation route, a moving map, an engine-indicating and crew-alerting system information, weather information, airport information, other information, or various combinations of information all on the same display screen. In addition, a multi-function display may include two independently controllable portions (hereinafter "display fields"). An advantage of this arrangement is that each multi-function display is able to present more information to the pilot without eliminating information already presented to the pilot. Accordingly, the pilot has more information at his or her disposal when operating the aircraft. Another advantage of this feature is that if one display medium becomes faulty and is unable to present information, more options are available for presenting the information because each remaining multi-function display can present two types of information independently.

The display of information on the flight deck of an aircraft may be driven by a flight management system, other systems, or various combinations of systems on the aircraft. A flight management system is a specialized computer system that automates a wide variety of in-flight tasks related to navigation, thereby reducing the workload of the aircraft flight crew.

The information displayed on the flight deck of an aircraft may be controlled to display flight information as needed. The ability to control the information displayed on the flight deck of an aircraft may simplify aircraft operation and navigation and may allow the aircraft operator to focus on the most pertinent information.

Current systems and methods for displaying information on the flight deck of an aircraft may limit the ability of a pilot or other operator of the aircraft to control and interact with the information displayed. Current systems and methods for displaying information on the flight deck of an aircraft also may limit the ability to improve the display of information on the flight deck of an aircraft. In particular, displays on a control pedestal (also known as an aislestand) between two pilots are often located aft of the pilots. Such displays are standardized so that "Up" on the display device is directed towards the nose of the aircraft. While this is consistent in terms of usability by both pilots, it is suboptimal for both pilots because the forwardly oriented display information between the pilots is difficult for each individual pilot to read, resulting in their having to crane their necks or look under their arms to see the displayed information.

SUMMARY

The subject matter disclosed in some detail below is directed to systems and methods for changing the orientation of information displayed on a display device mounted on a control pedestal at a position between two seats. More specifically, the subject matter is directed to changing the orientation of information displayed on a display device located on a control pedestal of an aircraft so that, instead of sub-optimal joint viewing of the displayed information by two flight crew members, an individual flight crew member may read the displayed information more easily. In accordance with some embodiments, the system enables either the pilot or the co-pilot to select a respective more optimal orientation for the displayed information for individual viewing. The system is further configured such that each flight crew member may separately then quickly switch the display mode back to the "up is forward" orientation for joint viewing. Returning to the "up is forward" orientation may also be set to occur as a function of time. In the "up is forward" orientation, the information may be displayed in either a "landscape" mode, in which two data fields are side by side, or a "portrait" mode, in which two data fields are stacked one on top of the other.

In accordance with some embodiments, the display system is configured such that the person seated on the left-hand side of the control pedestal may easily reach out to touch a first virtual button displayed on the screen of the display device to cause the orientation of the displays to change by +90 degrees (clockwise). (As used herein, the term "touching a virtual button" means contacting a display screen with a finger or stylus in an area where symbology representing the virtual button is visible.) Analogously, the display system is further configured such that the person seated on the right-hand side of the control pedestal may easily reach out to touch a second virtual button to cause the orientation of the displays to change by −90 degrees (counterclockwise). The first and second virtual buttons are both located outside the areas in which the displays (e.g., a navigation display and an engine display) are presented. In one proposed implementation, the first virtual button is positioned adjacent to a left side of the display device (the side closest to the pilot seat), while the second virtual button is positioned adjacent to a right side of the display device (the side closest to the co-pilot seat). Optionally, the display system is further configured to display a third virtual button which is equidistant from the pilot and co-pilot seats. In response to a flight crew member touching the third virtual button, the information being displayed on the screen returns to the "up is forward" orientation.

In accordance with other embodiments, the display system is configured such that the person seated on the left-hand side of the control pedestal may easily depress a first physical button that is mounted on the left side of the bezel of a pedestal-mounted display device (and that is coupled to an electrical switch) to cause the orientation of the displays to change by +90 degrees. Analogously, the display system is further configured such that the person seated on the right-hand side of the control pedestal may easily depress a second physical button that is mounted on the right side of the bezel of a pedestal-mounted display device (and that is coupled to an electrical switch) to cause the orientation of the displays to change by −90 degrees. Optionally, the display system further includes a third physical button mounted on the top or bottom side of the bezel equidistant from the two pilot seats. In response to a flight crew member depressing the third physical button, the displays being displayed on the display medium returns to the "up is forward" orientation. In one proposed implementation, each physical button is configured to invoke a function in the form of an algorithm executed by a processor. Each physical button on the bezel may have an associated label presented on the display screen in an area adjacent to the physical button, which label identifies the function invoked when the physical button is pressed.

Although various embodiments of systems and methods for changing the orientation of information presented by a pedestal-mounted display device on the flight deck of an aircraft will be described in some detail below, one or more of those embodiments may be characterized by one or more of the following aspects.

One aspect of the subject matter disclosed in detail below is a method for displaying aircraft operations information on a display device mounted to a control pedestal on a flight deck of an aircraft. The method comprises: (a) receiving electrical data signals representing first and second data sets of operations information at the display device; (b) presenting first and second displays over first and second areas respectively of a display medium of the display device at a first time subsequent to receipt of the electrical data signals, the first display representing the first data set of operations information, the second display representing the second data set of operations information, and the first and second displays having a first orientation at the first time such that respective up directions of the first and second displays are parallel to a forward direction of the aircraft; (c) a first display orientation selection signal representing a selection of a change in orientation of the first and second displays to a second orientation different than the first orientation; and (d) presenting the first and second displays over the first and second areas respectively of the display medium of the display device at a second time subsequent to the first time in response to generation of the first display orientation selection signal, the first and second displays having the second orientation at the second time such that the up directions of the first and second displays are not parallel to the forward direction of the aircraft. In one proposed implementation, the first and second orientations are mutually orthogonal. At the first time, the first and second displays appear side by side when a viewer views the display medium from a position aft of the control pedestal and facing in the forward direction of the aircraft. At the second time the first and second displays appear one above another when a viewer views the display medium while seated in a seat adjacent to the control pedestal.

In accordance with some embodiments of the method described in the immediately preceding paragraph, the method further comprises: presenting an image of a virtual button or sensing an orientation on the side of the display area in a third area of the display medium; and contacting the display device in an area overlying the third area of the display medium, wherein the first display orientation selection signal is generated in response to the contacting. In accordance with other embodiments, the method further comprises pushing a physical button, wherein the first display orientation selection signal is generated in response to pushing the physical button.

In accordance with one possible implementation, the method further comprises: (e) timing a duration of an interval of time starting at the second time; detecting when the duration of the interval of time reaches a specified duration; (f) generating a second display orientation selection signal when the specified duration has been reached; and (g) presenting the first and second displays over the first and second areas respectively of the display medium of the display device subsequent to a time when the specified duration has been reached in response to generation of the second display orientation selection signal, the first and second displays having the first orientation subsequent to the time when the specified duration has been reached such that the up directions of the first and second displays subsequent to the time when the specified duration has been reached are parallel to the forward direction of the aircraft.

Another aspect of the subject matter disclosed in detail below is a flight deck of an aircraft comprising: first and second seats; a forward instrument panel positioned forward of the first and second seats; a control pedestal positioned aft of the forward instrument panel and extending between the first and second seats; a display device positioned on the control pedestal, wherein the display device comprises a display medium and a user interface configured for receiving a user selection; and a computer system configured to control a format of information presented by the display device in dependence on display orientation selection signals representing user selections received from the display device. The computer system is further configured to execute operations comprising: (a) controlling the display device to present first and second displays over first and second areas respectively of the display medium of the display device at a first time, the first display representing a first data set of operations information, the second display representing a second data set of operations information, and the first and second displays having a first orientation at the first time such that respective up directions of the first and second displays at the first time are parallel to a forward direction of the aircraft; (b) receiving a display orientation selection signal representing a user selection from the display device: and (c) controlling the display device to present the first and second displays over the first and second areas respectively of the display medium of the display device at a second time subsequent to the first time in response to receipt of the first display orientation selection signal, the first and second displays having a second orientation at the second time such that the up directions of the first and second displays at the second time are not parallel to the forward direction of the aircraft.

A further aspect of the subject matter disclosed in detail below is a display system positioned between two seats, the display system comprising: a display device comprising a display medium disposed in a generally horizontal plane and a user interface configured for receiving a user selection; and a computer system configured to control a format of information presented by the display device in dependence on display orientation selection signals representing user selections received from the display device. The computer system is further configured to execute operations comprising: controlling the display device to present first and second displays over first and second areas respectively of the display medium of the display device at a first time, the first display representing a first data set of operations information, the second display representing a second data set of operations information, and the first and second displays having a first orientation at the first time such that respective up directions of the first and second displays at the first time are parallel to the forward direction; receiving a display orientation selection signal representing a user selection from the display device: and controlling the display device to present the first and second displays over the first and second areas respectively of the display medium of the display device at a second time subsequent to the first time in response to receipt of the display orientation selection signal, the first and second displays having a second orientation at the second time such that the up directions of the first and second displays at the second time are orthogonal to the forward direction.

In accordance with some embodiments of the display system described in the immediately preceding paragraph, the computer system is further configured to control the display device to display symbology representing a virtual button in a third area of the display medium; the user interface comprises a touchscreen overlaid on the display medium that generates the display orientation selection signal in response to contact with an area of the touchscreen overlying the third area of the display medium; and the display device is further configured to send the display orientation selection signal representing the user selection to the computer system. In accordance with other embodiments of the display system, the user interface of the display device comprises a physical button; and the display device is further configured to send the display orientation selection signal representing the user selection to the computer system in response to depression of the physical button.

Other aspects of systems and methods for changing the orientation of information presented by a pedestal-mounted display device on the flight deck of an aircraft are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Illustrative embodiments of systems and methods for changing the orientation of information presented by a pedestal-mounted display device on the flight deck of an aircraft are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following disclosure describes systems and methods for displaying aircraft operations information onboard an aircraft. Certain specific details are set forth in the following description to provide a thorough understanding of various embodiments. Well-known structures, systems and methods often associated with displaying information have been either not shown or not described in detail below to avoid unnecessarily obscuring the description of the various embodiments. In addition, those of ordinary skill in the relevant art will understand that additional embodiments may be practiced without several of the details described below.

The embodiments described below may involve computer-executable instructions, such as routines executed by a programmable computer (e.g., a flight guidance computer). Those skilled in the relevant art will appreciate that the methodology proposed herein may be practiced on other computer system configurations as well. The intent of the design concept disclosed herein is to have the display and its interfaces be transparent to the underlying function, such as flight management. In other words, the display and its control software passes data back and forth to the underlying function so that there is no need for display management in the underlying function. The technology proposed herein may also be practiced in distributed computing environments, where tasks or modules are performed by remote processing devices that are linked through a communications network. In a distributed computing environment, program modules or subroutines may be located in both local and remote memory storage devices. Aspects of the technology described below may be stored or distributed on computer-readable media, including magnetic or optically readable computer disks (e.g., removable disks), as well as distributed electronically over networks.

Figure 1:
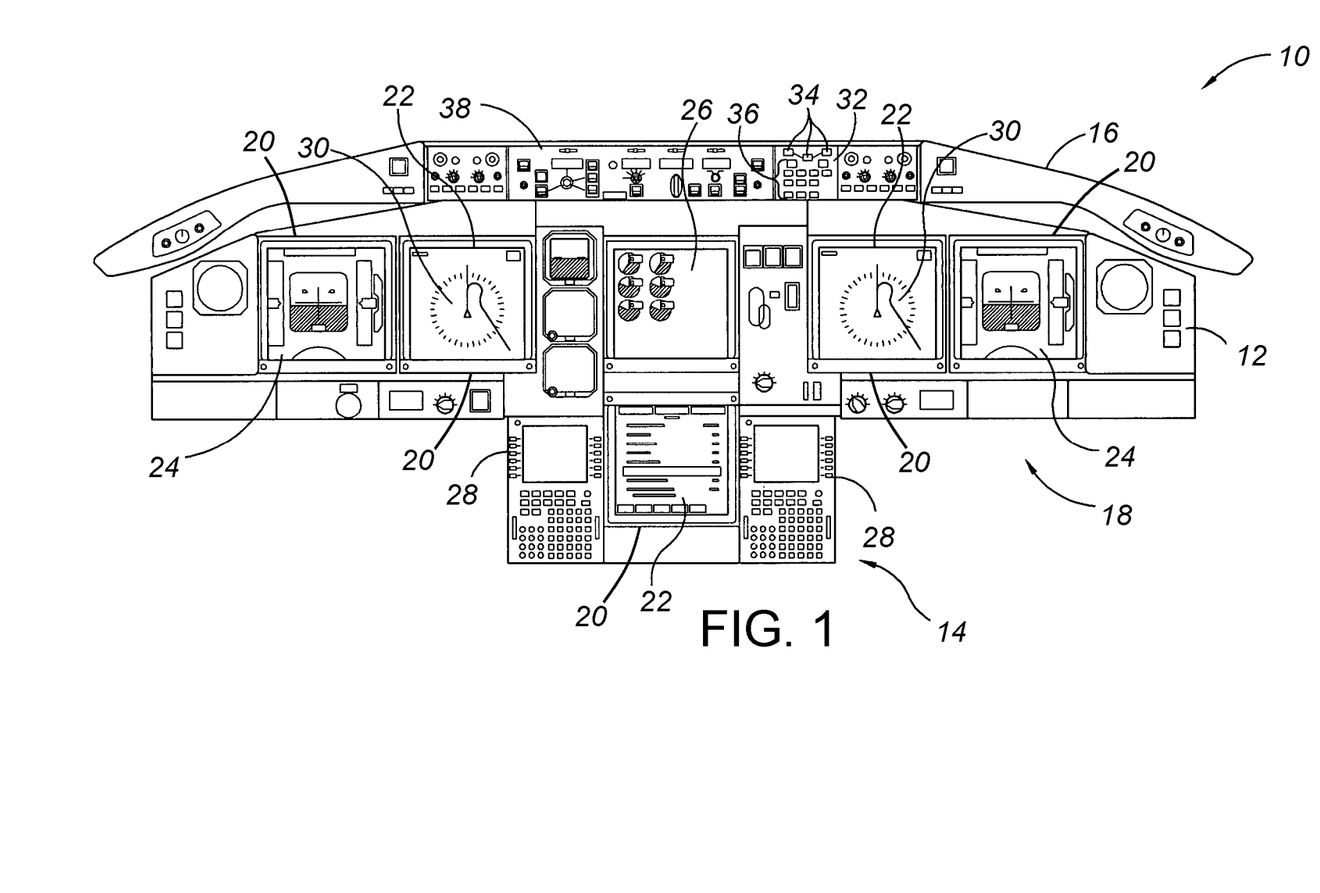
FIG. 1 is a diagram representing some components of a flight deck of an aircraft having a forward instrument panel and a control pedestal.

FIG. 1 illustrates a flight deck 10 of an aircraft having a forward instrument panel 12 and a control pedestal 14. Instruments 18 and display devices 20 are distributed over the forward instrument panel 12 and the control pedestal 14 for easy access by the pilots. The display devices 20 are controlled by respective display processors (not shown) to present various electronic visual displays of information on a display medium (e.g., a display screen), such as primary flight displays 24, an engine display 26, and three multi-function displays 22. The primary flight displays 24 provide the pilots with actual flight parameter information (e.g., flight attitude, airspeed and altitude), and multifunction displays 22 display other operator-selectable operations information, such as navigation displays 30, aircraft checklists, communication displays, and system status information.

Additional instrumentation is presented at a mode control panel 38 positioned on a glare shield 16 of the flight deck 10, and at control display units 28 positioned on the control pedestal 14. The glare shield 16 may also include a display select panel 32 having three display switches 34, one for each of the multi-function displays 22. A series of selector switches 36 each identify one type of available information to be displayed at the multi-function displays 22 (e.g., one selector switch identifies the electronic checklist, another identifies the navigation display, and still another identifies the communications display). In operation, the pilot first depresses one of the display switches 34 to select a particular one of the multi-function displays 22. Then the pilot presses one of the selector switches 36 to determine what type of information will be displayed at the selected multi-function display 22.

Figure 2:
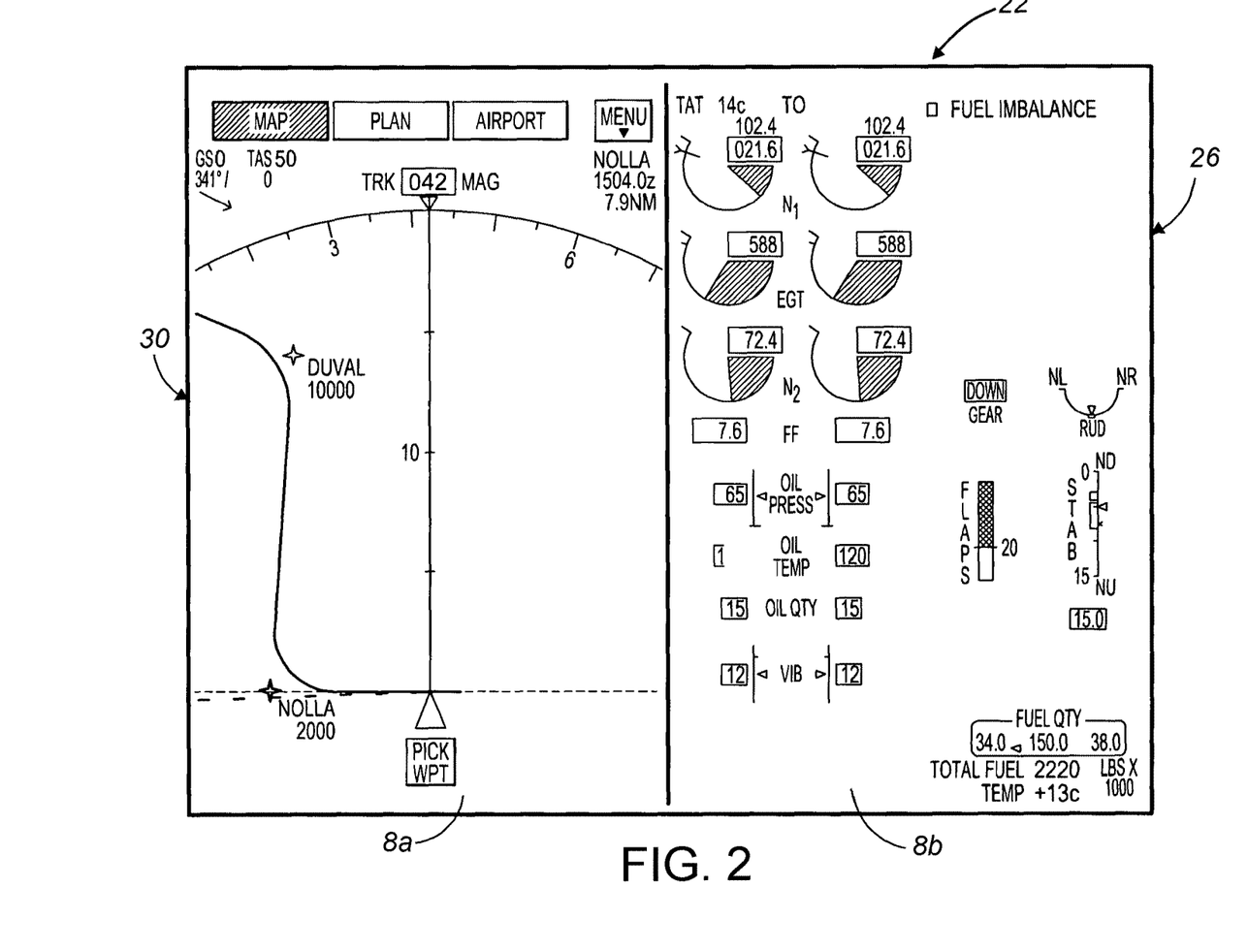
FIG. 2 is a diagram representing a screenshot of a multi-function display in a mode in which a first data field displays a navigation display while a second data field displays an engine display.

Each multi-function display 22 may have a first portion (hereinafter "first data block") presented over a first display area field and a second portion (hereinafter "second data block") presented over a second display area field on the display medium (e.g., display screen) of the associated display device 20. FIG. 2 is a diagram representing a multi-function display 22 in a mode in which a first display area 8a presents a navigation display 30, while a second display area 8b presents an engine display 26. In one embodiment, each of the first and second display areas 8a and 8b may occupy approximately half the available display area available in a dual-function display. In other embodiments, the first and second display areas 8a and 8b may occupy different fractional amounts of the available display area. In any of these embodiments, the information presented in one display area may be entirely independent of the information presented in the other display areas. In other embodiments, the first and second display areas 8a and 8b may be combined to display information in a larger format.

Although the innovative display system proposed herein may be installed on a flight deck of the type depicted in FIG. 1, which has a control pedestal 14 equipped with a pair of control display units 28 and a display device 20 configured for multi-function display 22 and positioned between the control display units 28, the display system proposed herein may also be installed on a control pedestal not equipped with control display units.

Figure 3:
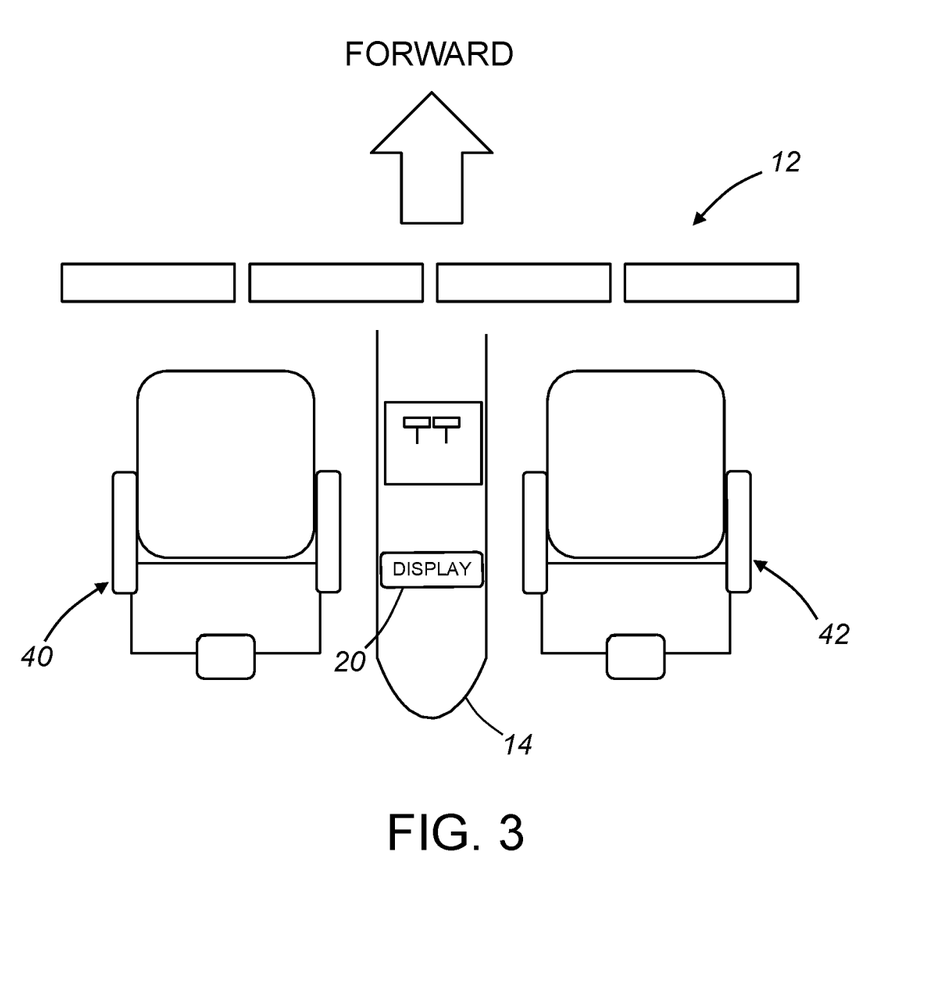
FIG. 3 is a diagram representing a top view of a typical flight deck having a control pedestal equipped with a display device configured for multi-function display, but not equipped with control display units.

FIG. 3 is a diagram representing a top view of a typical flight deck 10 having a control pedestal 14 equipped with a display device 20 configured for multi-function display and not equipped with control display units. The flight deck 10 depicted in FIG. 3 further comprises a pilot seat 40 and a co-pilot seat 42, both seats facing in a forward direction (indicated by an arrow in FIG. 3) and toward the instrument panel 12. The display device 20 is mounted to the control pedestal 14 at a position midway between pilot seat 40 and co-pilot seat 42. Typically the display device 20 is controlled to present a multi-function display in which the up direction of two displays (e.g., the navigation display 30 and engine display 26 depicted in FIG. 2) is parallel to the forward direction of the aircraft to enable joint viewing by two flight crew members respectively seated in the pilot and co-pilot seats 40 and 42. This orientation will be referred to hereinafter as the "default orientation".

The display technology proposed herein enables a flight crew member to selectively terminate the default orientation of the multi-function display being presented on the display device 20 and instead initiate a change in orientation. In one proposed implementation, a pilot seated in the pilot seat 40 may manually interface with the display device 20 to activate the display system to change the orientation of the multi-function display being presented by +90 degrees (clockwise in the view of FIG. 3). With this clockwise orientation, the pilot may read the information presented more easily. Conversely, a co-pilot seated in the co-pilot seat 42 may manually interface with the display device 20 to activate the display system to change the orientation of the multi-function display being presented by −90 degrees (counterclockwise in the view of FIG. 3). With this counterclockwise orientation, the co-pilot may read the information presented more easily.

A display system in accordance with one embodiment will now be described in part with reference to FIGS. 4A and 4B. The display device 20 is positioned on the control pedestal 14 (only a portion of which is shown). In accordance with one proposed implementation, the display device 20 includes a display medium 3 (e.g., a display screen) having a height measured in a forward direction which is less than a width measured in a direction orthogonal to the forward direction. The display medium 3 is bounded by a bezel 50. In the example shown in FIGS. 4A and 4b, the bezel 50 has the shape of a rectangle with rounded corners. More generally, the bezel comprises mutually parallel left and right sides and mutually parallel top and bottom sides that either are connected by rounded corners (as shown in FIGS. 4A and 4B) or intersect at rectilinear corners (not shown in the drawings).

Figure 4A:
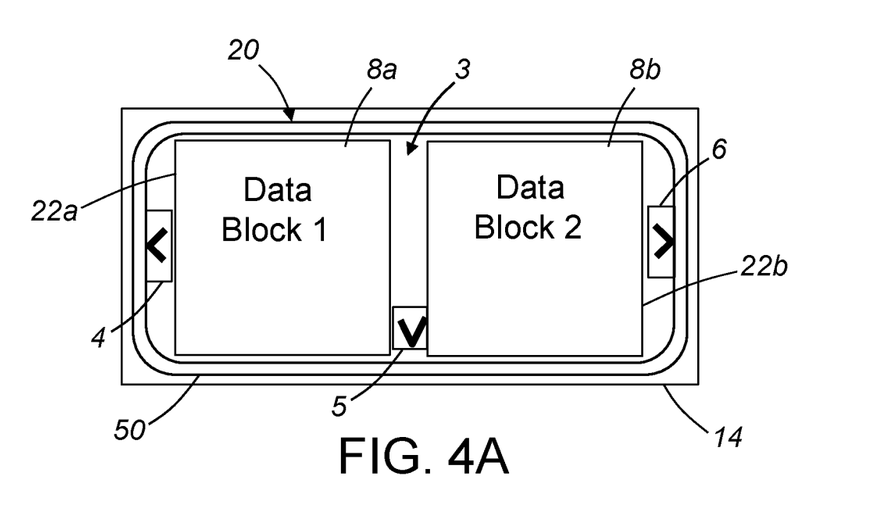
FIGS. 4A and 4B are diagrams representing respective top views of a pedestal-mounted display device that is configured to enable a flight crew member to select either an "up is forward" orientation of the displayed information (see FIG. 4A) or an orientation orthogonal to the "up is forward" orientation (see FIG. 4B) using virtual buttons in accordance with one embodiment.
Figure 4B:
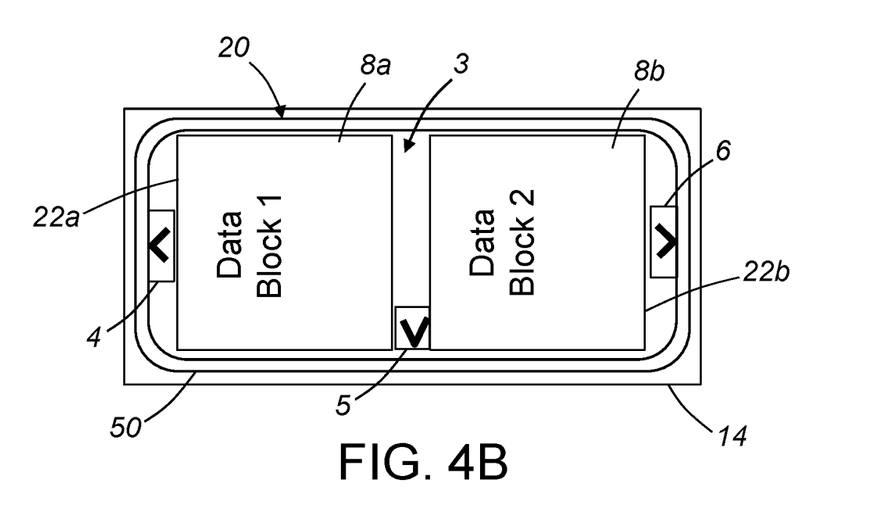

The display system includes the display device 20 shown in FIGS. 4A and 4B and a computer system (not shown in FIGS. 4A and 4B) that is programmed to control operation of the display device 20). More specifically, the display device 20 is electrically connected to a computer system that is configured to control the display device 20 in dependence on user (e.g., pilot) selections. In particular, the computer system is configured to control a format of information presented by the display device 20 in dependence on display orientation selection signals received from the display device 20, which display orientation selection signals represent user selections of a particular display orientation.

When display device 20 is controlled to display a multi-function display with the default orientation at a first time, the first and second displays 22a and 22b of that multi-function display will appear side by side (see FIG. 4A) as seen from the viewpoint of a person positioned aft of the control pedestal 14 on the flight deck and facing in the forward direction of the aircraft. In contrast, when display device 20 is controlled to display the multi-function display with the clockwise or counterclockwise orientation at a second time subsequent to the first time, the first and second displays 22a and 22b of the multi-function display appear one above another (see FIG. 4B) when viewed by a flight crew member seated in the co-pilot seat 42.

As seen in FIG. 4A, at a first time the display system may present a multi-function display that includes a first display 22a (which is a visualization of Data Block 1) in a first display area 8a of the display medium 3 of the display device 20 and a second display 22b (which is a visualization of Data Block 2) in a second display area 8b of the display medium 3. The first display 22a represents a first data set of operations information (identified as Data Block 1 in FIG. 4A). The second display 22b represents a second data set of operations information (identified as Data Block 2 in FIG. 4A). In the situation depicted in FIG. 4A, the first and second displays 22a and 22b at the first time have a first orientation at the first time such that respective up directions of the first and second displays 22a and 22b at the first time are parallel to the forward direction of the aircraft (indicated in FIG. 3). In contrast, in the situation depicted in FIG. 4B, the first and second displays 22a and 22b have a second orientation at a second time (e.g., subsequent to the first time) such that respective up directions of the first and second displays 22a and 22b at the second time are orthogonal to the forward direction of the aircraft.

Figure 5:
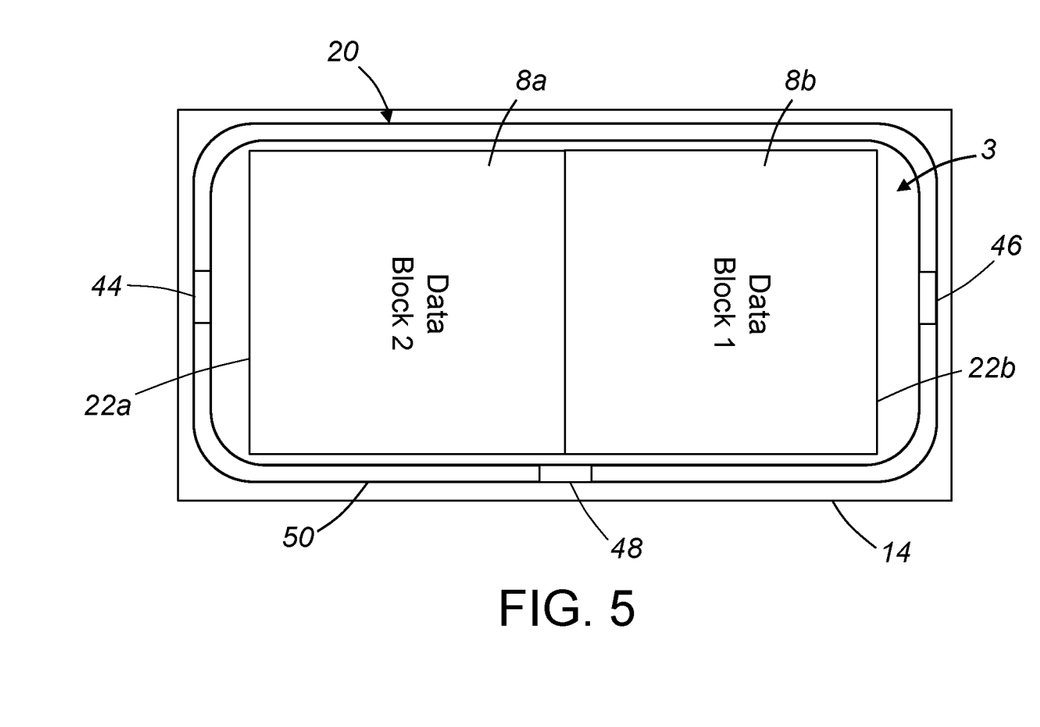
FIG. 5 is a diagram representing a top view of a pedestal-mounted display device that is configured to enable a flight crew member to select either an "up is forward" orientation of the displayed information or an orthogonal orientation using a physical button in accordance with another embodiment.

The display device 20 further includes a user interface configured for receiving a user selection. During in-flight operations, the pilot or co-pilot may take action to change the orientation of the first and second displays 22a and 22b by manually interacting with the user interface. The user interface may take the form of virtual buttons displayed on the display medium 3 (as shown in FIGS. 4A and 4B) or physical buttons (e.g., soft keys or hard keys) mounted to the bezel 50 as shown in FIG. 5 (discussed in some detail later).

In the embodiment depicted in FIGS. 4A and 4B, the display device 20 includes a touchscreen (not indicated in FIGS. 4A and 4B) overlaid on the display medium 3. As used throughout this disclosure, the term "touchscreen" means any capacitive display device or other interface surface that allows a user to provide input to a corresponding device or system by interacting with one or more virtual controls represented on a display surface using a finger, stylus, or other mechanism. A "virtual button" is any representation of a physical button presented on the display medium 3 in an area of the touchscreen where a user may select a function by contacting the touchscreen in that area. The touchscreen generates a display orientation selection signal in response to contact with an area of the touchscreen overlying the virtual button. The display device 20 is further configured to send the display orientation selection signal representing the user selection to the computer system that controls the display device 20.

In accordance with some embodiments, a computer system (e.g., one or more processors connected by a data bus) is configured to control the display device 20 to display not only the first and second displays 22a and 22b inside the first and second display areas 8a and 8b respectively, but also three virtual buttons 4, 5 and 6 outside the first and second display areas 8a and 8b. In accordance with the proposed implementation depicted in FIGS. 4A and 4B, the first virtual button 4 is presented in an area between the first display area 8a and the left side of the bezel 50, the second virtual button 6 is presented in an area between the second display area 8b and the right side of the bezel 50, and the third virtual button 5 is presented in an area between the first and second display areas 8a and 8b. Although in this example the third virtual button 5 is placed adjacent to the bottom side of the bezel 50, its elevational position on the display medium 3 may be adjusted in dependence on the positions of the pilot and co-pilot seats 40 and 42 relative to the display device 20 to ensure that both the pilot and co-pilot can easily reach the virtual button 5.

Any one of three display orientations (e.g., a default orientation, a first orthogonal orientation that differs from the default orientation by +90°, and a second orthogonal orientation that differs from the default orientation by −90°) may be selected by touching (e.g., using a finger or stylus) one of the virtual buttons 4, 5 and 6. In response to touching one of the virtual buttons 4, 5 and 6, a display orientation selection signal (indicating the user selection) is sent from the display device 20 to the computer system that controls the display device 20.

For example, in response to receipt at a second time (subsequent to the aforementioned first time) of a first display orientation selection signal indicating that virtual button 6 has been touched, the computer system controls the display device 20 to present the first and second displays 22a and 22b with an orientation such that the up directions of the first and second displays 22a and 22b are orthogonal to the forward direction of the aircraft and pointing in a port direction, as depicted in FIG. 4B. This enables the person sitting in co-pilot seat 42 (see FIG. 3) to read the information presented by the first and second displays 22a and 22b more easily than if the information were being presented with the default orientation.

Similarly, in response to receipt at a third time (subsequent to the second time) of a second display orientation selection signal indicating that virtual button 4 has been touched, the computer system controls the display device 20 to present the first and second displays 22a and 22b with an orientation such that the up directions of the first and second displays 22a and 22b are orthogonal to the forward direction of the aircraft and pointing in a starboard direction. In other words, in response to receipt of the second display orientation selection signal, the first and second displays 22a and 22b have an orientation at the third time such that the up directions of the first and second displays 22a and 22b at the third time are opposite to the up directions of the first and second displays 22a and 22b at the second time. This enables the person sitting in pilot seat 40 to read the displays 22a and 22b more easily than if the information were being presented with the default orientation.

In an alternative scenario, virtual button 5 may be touched instead of virtual button 6. In this instance, in response to receipt of a second display orientation selection signal indicating that the virtual button 5 has been touched, the computer system controls the display device 20 to restore the default orientation of the first and second displays 22a and 22b, as seen in FIG. 4A. In accordance with some embodiments, the computer system is further configured to execute operations comprising: receiving a second display orientation selection signal from the display device indicating selection of virtual button 5; and controlling the display device 20 to present the first and second displays 22a and 22b over the first and second display areas 8a and 8b respectively of the display medium 3 at a third time subsequent to the second time in response to receipt of the second display orientation selection signal. In this instance, the first and second displays 22a and 22b again have the default orientation at the third time such that the up directions of the first and second displays 22a and 22b are parallel to the forward direction of the aircraft. This enables joint viewing by one or more flight crew members, such as a pilot seated in pilot seat 40, a co-pilot seated in co-pilot seat 42, and a flight engineer seated in a seat (not shown in FIG. 3) positioned aft of the control pedestal 14.

In accordance with an alternative embodiment, the computer system controlling the display device 20 is further configured to execute operations comprising: timing a duration of an interval of time starting at the second time (when the display orientation was changed from the default orientation to an orthogonal orientation); detecting when the duration of the interval of time reaches a specified duration; generating a second display orientation selection signal when the specified duration has been reached; and controlling the display device 20 to present the first and second displays 22a and 22b over the first and second areas 8a and 8b respectively of the display medium 3 at a third time subsequent to the second time in response to generation of the second display orientation selection signal. In this case, the first and second displays 22a and 22b have the default orientation at the third time such that the up directions of the first and second displays 22a and 22b are parallel to the forward direction of the aircraft.

In accordance with other embodiments, the user interface of the display device 20 includes a plurality of physical buttons. The display device 20 is configured to send a display orientation selection signal representing a user selection to the computer system in response to depression of any one of the physical buttons. FIG. 5 depicts one example of a display device 20 which is configured to enable a flight crew member to select either an "up is forward" orientation of the displayed information or an orthogonal orientation using physical buttons 44, 46 and 48 mounted to a bezel 50 of the display device 20.

Any one of three display orientations may be selected by pressing one of the physical buttons 44, 46 and 48. In response to pressing one of the physical buttons 44, 46 and 48, a corresponding display orientation selection signal is sent from the display device 20 to the computer system. In accordance with one proposed implementation, a default orientation (not shown in FIG. 5) may be selected by pressing physical button 48; a first orthogonal orientation (shown in FIG. 5) that differs from the default orientation by +90° may be selected by pressing physical button 44; and a second orthogonal orientation (not shown in FIG. 5) may be selected by pressing physical button 46.

FIGS. 4A, 4B and 5 depict a display device which is configured to display two data fields side by side in a "landscape" mode with the displayed information having the "up is forward" orientation. In alternative embodiments, the display device may be configured to display two data fields stacked one on top of the other in a "portrait" mode with the displayed information having the "up is forward" orientation. All of these embodiments share the common feature that the orientation of the information displayed in the data fields may be changed by flight crew interaction with virtual and/or physical buttons accessible on the display device.

Figure 6:
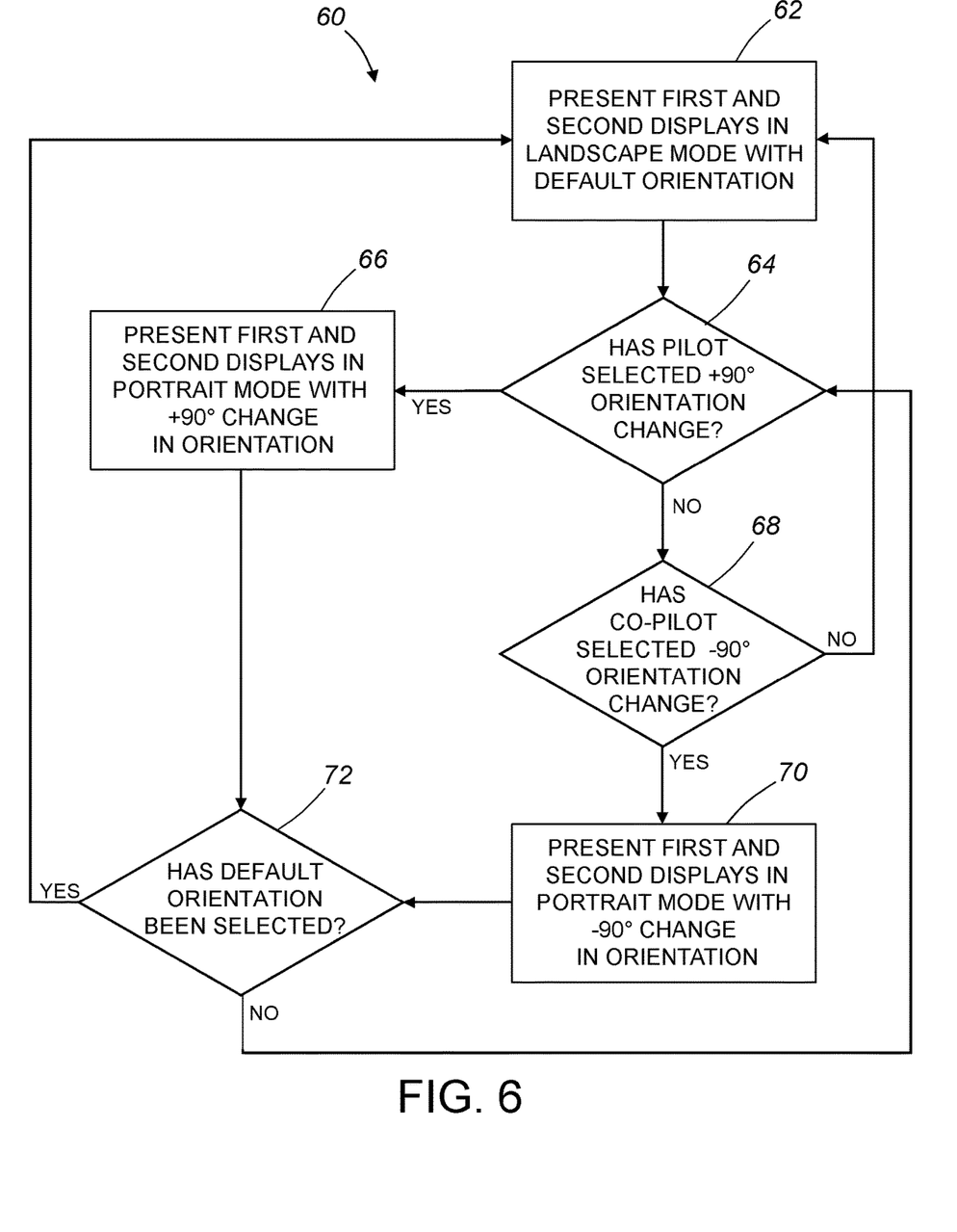
FIG. 6 is a flowchart identifying some steps of a method for displaying aircraft operations information on a pedestal-mounted display device on a flight deck of an aircraft in accordance with one embodiment.

FIG. 6 is a flowchart identifying some steps of a method 60 for displaying aircraft operations information on a pedestal-mounted display device on a flight deck of an aircraft in accordance with one embodiment. In a default state during aircraft operation, first and second displays are presented in landscape mode with the default configuration (operation 62). The computer system monitors the display orientation selection signals in accordance with an algorithm. In accordance with one sequence of operations, first a determination is made whether the pilot has selected a +90° change in orientation of the first and second displays or not (operation 64) and then a determination is made whether the co-pilot has selected a −90° change in orientation of the first and second displays or not (operation 66). In the alternative, operation 68 may be performed prior to operation 64.

If a determination is made in operation 64 that the pilot has selected a +90° change in orientation of the first and second displays, the first and second displays are presented in portrait mode with a first orthogonal orientation that differs from the default orientation by +90° (operation 66). Conversely, if a determination is made in operation 68 that the co-pilot has selected a −90° change in orientation of the first and second displays, the first and second displays are presented in portrait mode with a second orthogonal orientation that differs from the default orientation by −90° (operation 70). In either case, subsequent to changing the display to have an orthogonal orientation, the computer system makes a determination whether the default orientation has been selected or not (operation 72). On the one hand, if a determination is made in operation 72 that the default orientation has not been selected, the data processing by the computer system returns to operation 64. On the other hand, if a determination is made in operation 72 that the default orientation has been selected, then the first and second displays are again presented in landscape mode with the default configuration (operation 62).

Figure 7:
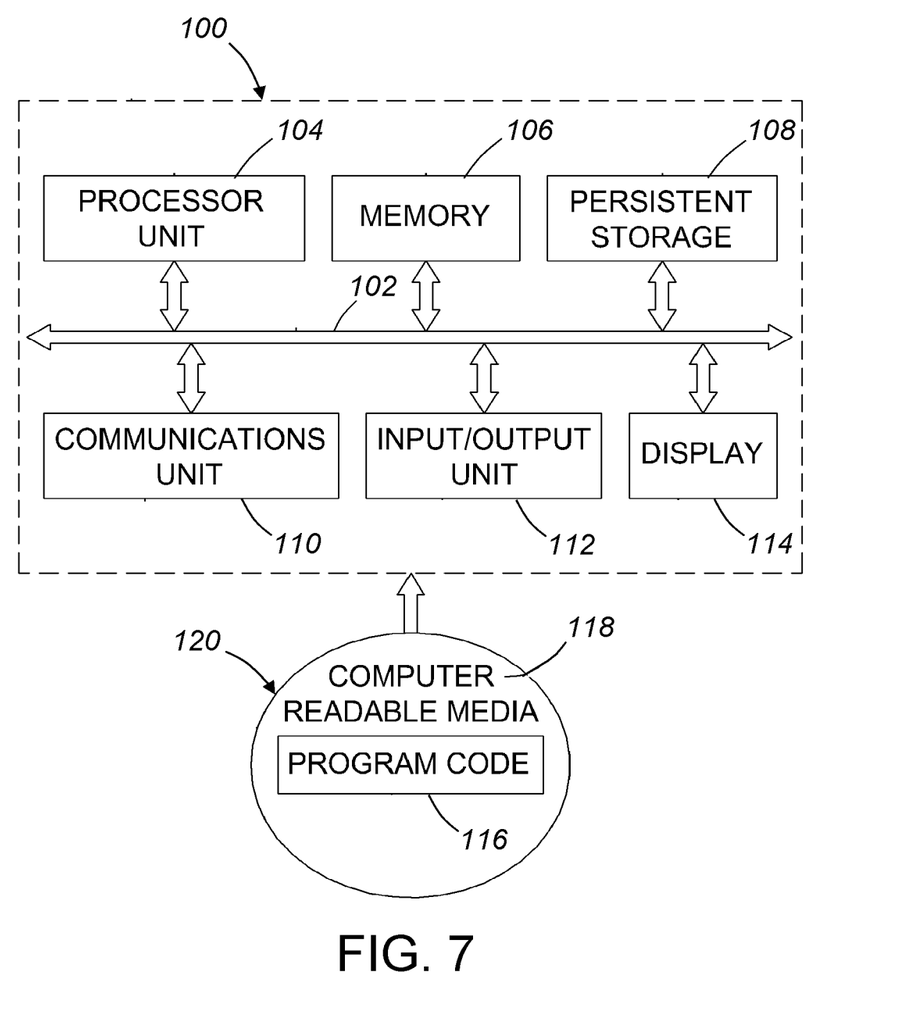
FIG. 7 is a block diagram identifying some components of a computer that may be configured to control the display of aircraft operations information on a pedestal-mounted display device on a flight deck of an aircraft in accordance with one embodiment.
Figure 8:
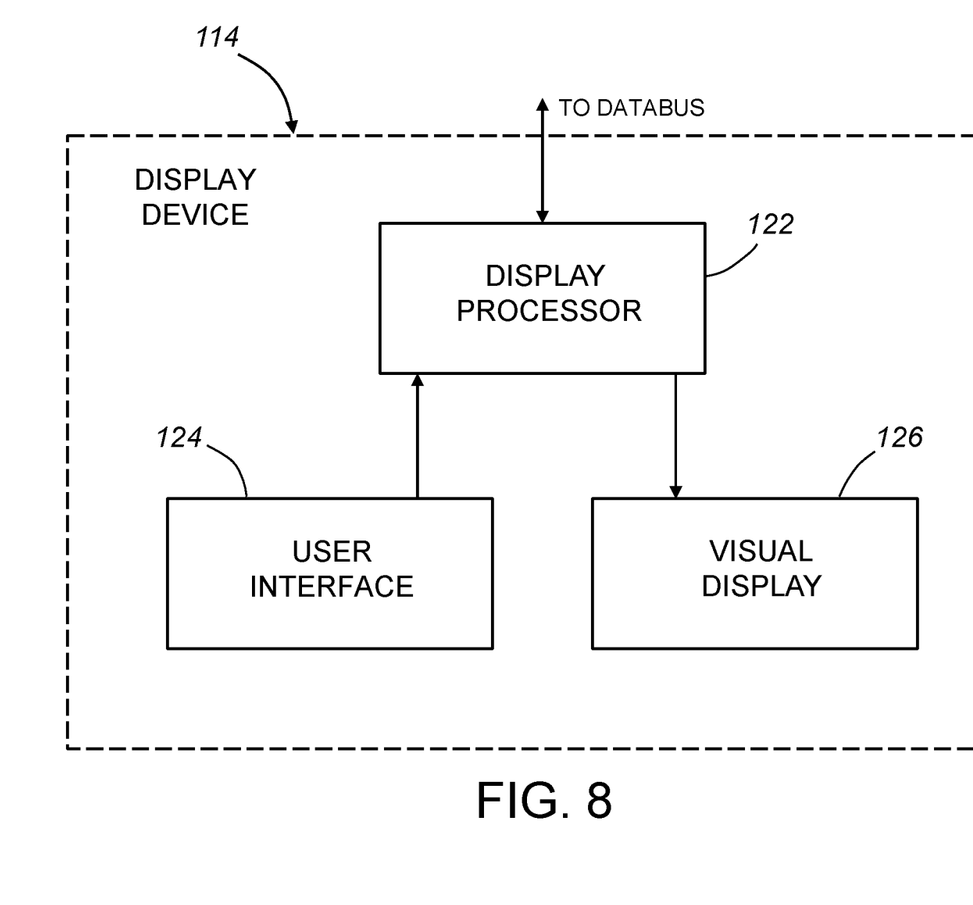
FIG. 8 is a block diagram identifying some components of a display device capable of presenting displays containing symbology representing aircraft operations information and enabling a user to select an orientation of the display.

FIG. 7 is a block diagram identifying some components of a system 100 for processing aircraft operations data and then displaying symbology representing the processed aircraft operations information on a pedestal-mounted display device 114 on a flight deck of an aircraft in accordance with one embodiment. The system 100 is configured to perform the algorithm partly depicted in FIG. 6. In this example, system 100 includes a data bus 102, which provides communications between a processor unit 104, a memory 106, a persistent storage 108, a communications unit 110, an input/output unit 112, and a display device 114. The display device 114 includes an electronic visual display 126 (e.g., a liquid-crystal display), a user interface 124 (e.g., a touch screen layered on the electronic visual display 126 or a hardware switch command) and a display processor 122 for controlling the operation of the electronic visual display 126 and receiving user inputs from the user interface 124 (see FIG. 8).

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type. Processor unit 104 may be programmed to receive aircraft operations data from other systems via the communications unit 110, process that aircraft operations data and then send the processed aircraft operations data and display format information to the display processor 122 for presentation on the electronic visual display 126 (see FIG. 8). The display format information includes data indicating either the default or a user-selected display orientation.

Memory 106 and persistent storage 108 are examples of storage devices. A storage device is any piece of hardware that is capable of storing information either on a temporary basis and/or a permanent basis. Memory 106, in these examples, may be, for example, without limitation, a random access memory or any other suitable volatile or non-volatile storage device. Persistent storage 108 may take various forms depending on the particular implementation. For example, persistent storage 108 may be a hard drive, a flash memory, a rewritable optical disk, a rewritable magnetic tape, or some combination of the above.

Communications unit 110, in this example, is configured to enable system 100 to communicate with other data processing systems or devices. In these examples, communications unit 110 is a network interface card. Communications unit 110 may provide communications through the use of either or both physical and wireless communication links.

Input/output unit 112 allows for input and output of data with other devices that may be connected to system 100. For example, without limitation, input/output unit 112 may provide a connection for user input through a keyboard and mouse. Further, input/output unit 112 may send output to a printer. Display device 114 provides a mechanism to display information to a user in accordance with the methodology disclosed herein.

Instructions for the operating system and applications or programs are located on persistent storage 108. These instructions may be loaded into memory 106 for execution by processor unit 104. The processes of the different embodiments may be performed by processor unit 104 executing those instructions, which may be in the form of computer-executable program code. In the example depicted in FIG. 7, program code 116 is located in a functional form on non-transitory tangible computer-readable storage medium 118 that is selectively removable and may be loaded onto or transferred to system 100 for execution by processor unit 104. Program code 116 and non-transitory tangible computer-readable storage medium 118 form computer program product 120 in this example. In one example, non-transitory tangible computer-readable storage medium 118 is an optical or magnetic disc that is inserted or placed into a drive or other device that is part of persistent storage 108 for transfer onto a storage device, such as a hard drive that is part of persistent storage 108. Non-transitory tangible computer-readable storage medium 118 may take the form of a persistent storage, such as a hard drive, a thumb drive, or a flash memory that is connected to system 100.

While systems and methods for changing the orientation of information presented by a pedestal-mounted display device on the flight deck of an aircraft have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, computing device, or controller, such as a general-purpose central processing unit, a microcontroller, a reduced instruction set computer processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device". As used herein, the term "computer system" should be construed broadly to encompass a system having at least one computer or processor, and which may have multiple computers or processors that communicate through a network or bus.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

As used in the claims, the term "user interface" in the context of a virtual button presented on the display medium of a display device includes the physical elements of the touchscreen incorporated in the display device that enable the user interface functionality (e.g., user selection of a display orientation) of the virtual button, but does not include the visual image of the virtual button as represented by the states of the pixels of the display medium of the display device, which visual image of the virtual button is coextensive with the area in which a user may interact with the physical elements associated with the virtual button. This lexicological convention clarifies that the hardware of the display medium (e.g., a display screen) is distinct from the hardware of the user interface (e.g., a touchscreen adjacent to the display screen).

The invention claimed is:

1. A method for displaying aircraft operations information on a display device mounted to a control pedestal on a flight deck of an aircraft, comprising:
   receiving electrical data signals representing first and second data sets of operations information at the display device;
   presenting first and second displays over first and second areas respectively of a display medium of the display device at a first time subsequent to receipt of the electrical data signals, the first display representing the first data set of operations information, the second display representing the second data set of operations information, the first and second displays having a first orientation at the first time such that respective up directions of the first and second displays are parallel to a forward direction of the aircraft, and the first and second displays appearing side by side when a viewer views the operations information from a position aft of the control pedestal and facing in the forward direction of the aircraft;

generating a first display orientation selection signal representing a selection of a change in the orientation of the first and second displays to a second orientation orthogonal to the first orientation;

presenting the first and second displays over the first and second areas respectively of the display medium of the display device at a second time subsequent to the first time in response to generation of the first display orientation selection signal, the first and second displays having the second orientation at the second time such that the up directions of the first and second displays are orthogonal to the forward direction of the aircraft, and the first and second displays appearing one above another when a viewer views the operations information while seated in a pilot seat adjacent to the control pedestal;

generating a second display orientation selection signal representing a selection of a change in the orientation of the first and second displays back to the first orientation;

presenting the first and second displays over the first and second areas respectively of the display medium of the display device at a third time subsequent to the second time in response to generation of the second display orientation selection signal, the first and second displays having the first orientation at the third time such that the up directions of the first and second displays at the third time are parallel to the forward direction of the aircraft;

presenting an image of a first virtual button in a third area of the display medium at the first, second, and third times, wherein an orientation of the first virtual button at the second and third times is the same as the orientation of the first virtual button at the first time; and contacting the display device in an area overlying the third area of the display medium, wherein the first display orientation selection signal is generated in response to contacting the display device in the area overlying the third area of the display medium.

2. The method as recited in claim 1, further comprising:

presenting an image of a second virtual button in a fourth area of the display medium at the first, second, and third times, wherein an orientation of the second virtual button at the second and third times is the same as the orientation of the second virtual button at the first time; and contacting the display device in an area overlying the fourth area of the display medium, wherein the second display orientation selection signal is generated in response to contacting the display device in the area overlying the fourth area of the display medium.

3. The method as recited in claim 1, further comprising:

generating a third display orientation selection signal representing a selection of a change in the orientation of the first and second displays to a third orientation rotated 180 degrees relative to the first orientation; and presenting the first and second displays over the first and second areas respectively of the display medium of the display device at a fourth time subsequent to the second time in response to generation of the third display orientation selection signal, the first and second displays having the third orientation at the fourth time such that the up directions of the first and second displays at the fourth time are orthogonal to the forward direction of the aircraft.

4. The method as recited in claim 1, further comprising:

timing a duration of an interval of time starting at the second time;

detecting when the duration of the interval of time reaches a specified duration;

generating a second display orientation selection signal when the specified duration has been reached; and presenting the first and second displays over the first and second areas respectively of the display medium of the display device subsequent to a time when the specified duration has been reached in response to generation of the second display orientation selection signal, the first and second displays having the first orientation subsequent to the time when the specified duration has been reached such that the up directions of the first and second displays subsequent to the time when the specified duration has been reached are parallel to the forward direction of the aircraft.

5. The method as recited in claim 1, further comprising:

generating a third display orientation selection signal representing a selection of a change in the orientation of the first and second displays to a third orientation opposite to the second orientation; and presenting the first and second displays over the first and second areas respectively of the display medium of the display device at a fourth time subsequent to the third time in response to generation of the third display orientation selection signal, the first and second displays having the third orientation at the fourth time such that the up directions of the first and second displays at the fourth time are opposite to the up directions of the first and second displays at the second time.

6. A flight deck of an aircraft comprising:

first and second seats;

a forward instrument panel positioned forward of the first and second seats;

a control pedestal positioned aft of the forward instrument panel and extending between the first and second seats;

a display device positioned on the control pedestal, wherein the display device comprises a display medium and a user interface configured for receiving a user selection; and a computer system configured to control a format of information presented by the display device in dependence on display orientation selection signals representing user selections received from the display device, wherein the computer system is further configured to execute operations comprising:

controlling the display device to present first and second displays over first and second areas respectively of the display medium of the display device at a first time, the first display representing a first data set of operations information, the second display representing a second data set of operations information, the first and second displays having a first orientation at the first time such that respective up directions of the first and second displays at the first time are parallel to a forward direction of the aircraft, and the first and second displays appearing side by side when a viewer views the operations information from a position aft of the control pedestal and facing in the forward direction of the aircraft;

receiving a first display orientation selection signal representing a first user selection of a change in the orientation of the first and second displays to a second orientation orthogonal to the first orientation from the display device;

controlling the display device to present the first and second displays over the first and second areas respectively of the display medium of the display device at a second time subsequent to the first time in response to receipt of the first display orientation selection signal, the first and second displays having a second orientation at the second time such that the up directions of the first and second displays at the second time are orthogonal to the forward direction of the aircraft, and the first and second displays appearing one above another when a viewer views the operations information while seated in a pilot seat adjacent to the control pedestal;

receiving a second display orientation selection signal representing a second user selection of a change in the orientation of the first and second displays back to the first orientation from the display device;

controlling the display device to present the first and second displays over the first and second areas respectively of the display medium of the display device at a third time subsequent to the second time in response to receipt of the second display orientation selection signal, the first and second displays having the first orientation at the third time such that the up directions of the first and second displays at the third time are parallel to the forward direction of the aircraft; and controlling the display device to present an image of a first virtual button in a third area of the display medium at the first, second, and third times, wherein an orientation of the first virtual button at the second and third times is the same as the orientation of the first virtual button at the first time, wherein the user interface comprises a touchscreen overlaid on the display medium that generates the first display orientation selection signal in response to contact with an area of the touchscreen overlying the third area of the display medium.

7. The flight deck as recited in claim 6, wherein:

the computer system is further configured to control the display device to display symbology representing a second virtual button in a fourth area of the display medium at the first, second and third times, wherein an orientation of the second virtual button at the second and third times is the same as the orientation of the second virtual button at the first time;

the touchscreen overlaid on the display medium generates the second display orientation selection signal in response to contact with an area of the touchscreen overlying the fourth area of the display medium; and the display device is further configured to send the second display orientation selection signal representing the second user selection to the computer system.

8. The flight deck as recited in claim 6, wherein the computer system is further configured to execute operations comprising:

timing a duration of an interval of time starting at the second time;

detecting when the duration of the interval of time reaches a specified duration;

generating a second display orientation selection signal when the specified duration has been reached; and controlling the display device to present the first and second displays over the first and second areas respectively of the display medium of the display device at a third time subsequent to the second time in response to generation of the second display orientation selection signal, the first and second displays having the first orientation at the third time such that the up directions of the first and second displays at the third time are parallel to the forward direction of the aircraft.

9. The flight deck as recited in claim 6, wherein the computer system is further configured to execute operations comprising:

receiving a third display orientation selection signal representing a third user selection from the display device: and controlling the display device to present the first and second displays over the first and second areas respectively of the display medium of the display device at a fourth time subsequent to the second time in response to receipt of the third display orientation selection signal, the first and second displays having a third orientation at the fourth time such that the up directions of the first and second displays at the fourth time are opposite to the up directions of the first and second displays at the second time.

10. A display system positioned between two seats, the display system comprising:

a display device comprising a display medium disposed in a generally horizontal plane and a user interface configured for receiving a user selection; and a computer system configured to control a format of information presented by the display device in dependence on display orientation selection signals representing user selections received from the display device, wherein the computer system is further configured to execute operations comprising:

controlling the display device to present first and second displays over first and second areas respectively of the display medium of the display device at a first time, the first display representing a first data set of operations information, the second display representing a second data set of operations information, the first and second displays having a first orientation at the first time such that respective up directions of the first and second displays at the first time are parallel to a forward direction, and the first and second displays appearing side by side when a viewer views the operations information from a position aft of the display device and facing in the forward direction;

receiving a first display orientation selection signal representing a first user selection of a change in the orientation of the first and second displays to a second orientation orthogonal to the first orientation from the display device;

controlling the display device to present the first and second displays over the first and second areas respectively of the display medium of the display device at a second time subsequent to the first time in response to receipt of the first display orientation selection signal, the first and second displays having a second orientation at the second time such that the up directions of the first and second displays at the second time are orthogonal to the forward direction, and the first and second displays appearing one above another when a viewer views the operations information while seated to one side of the display device;

receiving a second display orientation selection signal representing a second user selection of a change in the orientation of the first and second displays back to the first orientation from the display device;

controlling the display device to present the first and second displays over the first and second areas respectively of the display medium of the display device at a third time subsequent to the second time in response to receipt of the second display orientation selection signal, the first and second displays having the first orientation at the third time such that the up directions of the first and second displays at the third time are parallel to the forward direction; and controlling the display device to present an image of a first virtual button in a third area of the display medium at the first, second, and third times, wherein an orientation of the first virtual button at the second and third times is the same as the orientation of the first virtual button at the first time, wherein the user interface comprises a touchscreen overlaid on the display medium that generates the first display orientation selection signal in response to contact with an area of the touchscreen overlying the third area of the display medium.

11. The display system as recited in claim 10, wherein:
the computer system is further configured to control the display device to display symbology representing a second virtual button in a fourth area of the display medium at the first, second, and third times, wherein an orientation of the second virtual button at the second and third times is the same as the orientation of the second virtual button at the first time;

the touchscreen overlaid on the display medium generates the second display orientation selection signal in response to contact with an area of the touchscreen overlying the fourth area of the display medium; and the display device is further configured to send the second display orientation selection signal representing the second user selection to the computer system.

12. The method as recited in claim 1, wherein the first display is a navigation display and the second display is an engine display.

13. The flight deck as recited in claim 6, wherein the computer system is further configured to execute operations comprising presenting first and second virtual buttons in respective areas outside the first and second areas occupied by the first and second displays respectively, wherein the locations and orientations of the first and second virtual buttons are the same at the first and second times.

14. The flight deck as recited in claim 6, wherein the first display is a navigation display and the second display is an engine display.

15. The flight deck as recited in claim 6, wherein the up directions of the first and second displays at the second time are pointing in a port direction of the aircraft.

16. The flight deck as recited in claim 6, wherein the up directions of the first and second displays at the second time are pointing in a starboard direction of the aircraft.

17. The method as recited in claim 3, further comprising:
presenting an image of a second virtual button in a fourth area of the display medium at the first, second, and third times, wherein an orientation of the second virtual button at the second and third times time is the same as the orientation of the second first virtual button at the first time; and contacting the display device in an area overlying the fourth area of the display medium, wherein the third display orientation selection signal is generated in response to the contacting the display device in the area overlying the fourth area of the display medium.

18. The method as recited in claim 17, wherein the first display is a navigation display and the second display is an engine display.

19. The method as recited in claim 3, wherein the first display is a navigation display and the second display is an engine display.

20. The method as recited in claim 1, wherein the up directions of the first and second displays at the second time are pointing in a port direction of the aircraft.

21. The method as recited in claim 1, wherein the up directions of the first and second displays at the second time are pointing in a starboard direction of the aircraft.

* * * * *